(12) United States Patent
Tuval et al.

(10) Patent No.: US 12,115,682 B2
(45) Date of Patent: Oct. 15, 2024

(54) DELIVERY STATION AND METHOD FOR AUTONOMOUSLY STORING AND DELIVERING GOODS

(71) Applicant: 1MROBOTICS LTD., Bnei Darom (IL)

(72) Inventors: Roee Tuval, Holon (IL); Igor Levinsky, Tel Aviv (IL); David Prive, Modiin (IL); Itai Price, Tel Aviv (IL); Yadin Aharoni, Tel Aviv (IL); Eyal Yair, Bnei Darom (IL)

(73) Assignee: 1MROBOTICS LTD., Bnei Darom (IL)

( * ) Notice: Subject to any disclaimer, the term of this patent is extended or adjusted under 35 U.S.C. 154(b) by 462 days.

(21) Appl. No.: 17/563,112

(22) Filed: Dec. 28, 2021

(65) Prior Publication Data

US 2023/0202047 A1    Jun. 29, 2023

(51) Int. Cl.
*B25J 11/00* (2006.01)
*B25J 9/16* (2006.01)
*B65G 1/137* (2006.01)
*G07F 11/16* (2006.01)

(52) U.S. Cl.
CPC .......... *B25J 9/1687* (2013.01); *B25J 11/008* (2013.01); *B65G 1/1378* (2013.01); *G07F 11/165* (2013.01); *B65G 2209/04* (2013.01)

(58) Field of Classification Search
CPC ............................ B25J 9/1687; G07F 11/165
See application file for complete search history.

(56) References Cited

U.S. PATENT DOCUMENTS

| 8,483,869 | B2 * | 7/2013 | Wurman | G06F 7/00 700/214 |
| 11,776,351 | B2 * | 10/2023 | Yu | G07F 11/165 221/150 A |
| 2006/0206235 | A1 * | 9/2006 | Shakes | B65G 1/1378 700/216 |
| 2019/0344965 | A1 * | 11/2019 | Wilkinson | G07F 11/42 |
| 2021/0374815 | A1 * | 12/2021 | Smith | G07F 11/1657 |
| 2021/0380341 | A1 * | 12/2021 | Dugat | B65G 61/00 |

* cited by examiner

*Primary Examiner* — Gene O Crawford
*Assistant Examiner* — Ayodeji T Ojofeitimi
(74) *Attorney, Agent, or Firm* — AlphaPatent Associates Ltd.; Daniel J. Swirsky (57) ABSTRACT

A fully autonomous delivery station, including a management unit for receiving orders for goods, and a housing including one or more storage devices containing goods to be delivered, a moving collector moving between the one or more storage devices for collecting the goods, and kiosk used by a user of the delivery station for receiving the goods outside the housing.

20 Claims, 10 Drawing Sheets

DELIVERY STATION AND METHOD FOR AUTONOMOUSLY STORING AND DELIVERING GOODS

FIELD

The invention relates generally to autonomously storing and delivering goods.

BACKGROUND

There is a growing need for delivery services, mainly in the on-demand space. Consumers require that the goods are provided within short time durations (SLAs), sometimes within an hour or two, or even less, from the request time. This requires companies to increase efforts in the "last mile", to be closer to the consumers' residences and offices, as opposed to having larger warehouses outside city centers, which was the standard in the past. Companies need sufficient geographic coverage in cities in order to supply the goods quickly.

The goods are manufactured in the factory, then transferred to a regional warehouse, and from the regional warehouse they are transported to the "last mile" facilities (close to the consumers). The facilities may be shops that also work with delivery services which provide the goods to the consumers, or enable the consumers to come to the shops and collect the goods.

Fulfillment of last mile logistics in less than two hours is expensive, difficult and error-prone. For example, it involves challenging human resources management of low-skilled staff for recruiting, retaining, operating at multiple shifts, all potentially unreliable and inaccurate operations that lead to about 3% errors in orders due to manual packaging, stock visibility issues, restock forecasting, etc. Another challenge is inconsistent order preparation time that may take anywhere from 4 to 10 minutes.

Some of the above challenges may be solved by automating the delivery process. Additional challenges are high real estate costs, especially in metropolitan areas and the difficulty to setup Point of Consumer (POCs), a third party to act as a reseller or dark stores, which are needed to be in proximity to consumers. Another challenge is to align inventory with demand fluctuations, support for a single SKU is different from multi-SKUs.

SUMMARY OF THE INVENTION

In one aspect of the invention a fully autonomous delivery station is provided, including a management unit for receiving orders for goods, a housing, including one or more storage devices containing goods to be delivered, a moving collector moving between the one or more storage devices for collecting the goods, a kiosk used by a user of the delivery station for receiving the goods outside the housing.

In some cases, the delivery station further includes a packer module for packing multiple goods collected by the collector of a single order.

In some cases, the packer is secured to the collector when the collector collects the goods from the one or more storage devices.

In some cases, the delivery station further includes a main track installed on a longitudinal axis of the housing, where the moving collector moves along the main track.

In some cases, the delivery station further includes a push-pull module configured to move pallets inside the housing.

In some cases, the delivery station further includes a loading ramp configured to load new storage devices into the housing, where the loading ramp is movable outside the housing. In some cases, the delivery station further includes arms coupled on one side to the housing and on another side to the loading ramp, said arms maneuver the loading ramp.

In some cases, the housing includes a base, sidewalls extending from the base, where the loading station includes a door having an open state and a close state.

In some cases, the management system sends locations of goods requested in the orders to the collector. In some cases, the locations comprise an identifier of a specific storage device and height of the goods in the specific storage device.

In some cases, the management system sends identifiers of goods requested in the orders to the collector and the collector identifies the goods in the storage devices.

In some cases, the delivery station further includes a user interface coupled to the management system, said user interface is configured to receive an identifier of a specific order.

In some cases, at least some of the one or more storage devices is a pallet.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

The technical challenge solved using the invention is to provide automated stations that can supply goods quickly and accurately, without consuming big areas, as the real estate in cities is very expensive.

The technical solution disclosed herein is to provide a fully autonomous delivery station to dispense goods, for example to an end-user or to a delivery person. The delivery station includes physical components for receiving the goods, loading the goods in specific locations in the system, receiving orders and providing the orders. The term fully autonomous is defined in a manner that the station does not need any person to operate the components disclosed herein.

The delivery station includes a housing for example configured to prevent unauthorized persons to access the goods, and/or keeping the goods in desired conditions, for example a desired temperature and humidity ranges. The housing may be secured to a surface, such as a floor, pavement, for example using screws. The housing may comprise at least some of a group including a base, sidewalls extending upwards from the base and a ceiling.

The term "goods" refers to items that satisfy human wants and provide utility, for example, to a consumer making a purchase of a satisfying product. The goods in the delivery station may be packed, for example in cans, bottles, plastic boxes, cardboard boxes, bags made of polymers such as polyethylene and the like. The goods may be food products, beverages, electronic appliances, games, toys, clothes and the like.

The term "storage devices" refers to an object in the housing that stores goods. The object may be a shelf, a container, a box, a pallet and the like. The storage device may be flat transport structure, which supports goods in a stable fashion while being lifted by another object, such as a forklift, a pallet jack, a front loader, a jacking device, or an erect crane. The storage devices may be secured to the body of the housing with strapping, stretch wrap or shrink wrap. The storage devices can also be made of plastic, metal, wood, paper, and other materials.

Figure 1:
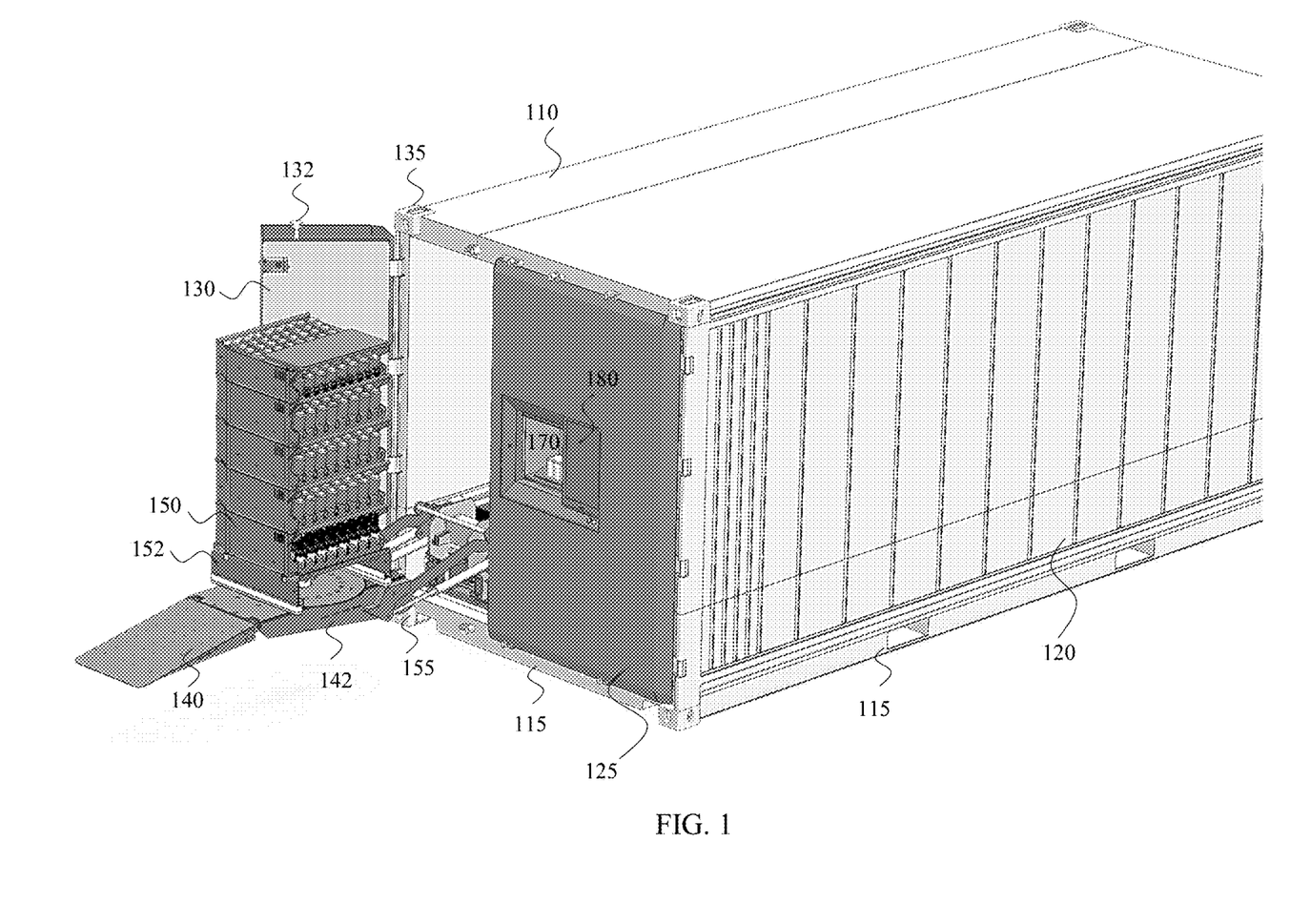
FIG. 1 shows an external view of the delivery station, according to exemplary embodiment of the invention.

FIG. 1 shows an external view of the delivery station, according to exemplary embodiment of the invention. The external view is defined as a view from outside the delivery station's housing. The housing includes a base 115, sidewalls 120 extending from the base 115 and a ceiling 110. The shape of the base 115 may be rectangular, for example to be easily carried on a truck/ship. In such case, the housing may have four sidewalls extending from the four edges of the base 115. In some exemplary cases, the size and shape of the housing may be of an intermodal container, easily shipped using trucks, trains and ships, and some mechanical and/or electrical components disclosed herein.

At least one of the sidewalls 120 enables loading goods into the delivery station and delivering goods from the delivery station. When delivering the goods, a kiosk 170 is opened. The kiosk 170 may be formed as a niche in one of the sidewalls 120. In standard mode of operation, the kiosk 170 is closed, for example using a movable sheet. When there is a requirement to open the kiosk, for example to deliver goods from the delivery station, the movable sheet is moved, for example sidewards, upwards, or downwards, enabling a person to access the goods. The goods may be placed on a surface inside the storage volume, such as a shelf located near the top end of the kiosk 170. In some cases, the movable sheet may move in response to a command from a management system of the delivery station. The command may be issued after the person receiving the goods is identified, for example by scanning a code, exchanging signals from the person's cellular phone and the like.

In some exemplary cases, the delivery station further includes a user interface 180 coupled to one of the sidewalls 120. The user interface 180 enables users to interact with the management system. Such interaction may include identification of persons, request of delivery, initiation of a loading process for loading goods into the housing 110 and the like.

In standard mode or operation, the housing is closed, to facilitate maintenance of desired conditions, such as light, temperature, humidity and the like. When goods are to be loaded into the delivery station, a door 130 of front sidewall 125 of the sidewalls 120 may be opened, to collect the goods 150. In some cases, a door will be open on one of the sidewalls 120 to allow fast replenishing of the delivery station. The goods 150 may be provided on a storage devices such as pallet 152, or on another movable base configured to carry the goods 150.

In standard operation mode, the door 130 is closed, preventing access to the storage volume defined inside the housing and keeping the volume inside the housing 110 in desired conditions, for example in terms of temperature and humidity. In loading mode, the door is either automatically opened, for example by an actuator, or by a mechanism unlocking a lock that prevents the door 130 from moving. The door 130 may move outside from the housing, or inside, towards the storage volume.

When loading new goods into the delivery station, a command is received at the management system to initiate a loading process. The loading process may comprise opening the door 130 and moving a loading ramp 140, 142 outside the storage volume via the aperture created by opening the door 130. The loading ramp 140, 142 may be placed on a surface on which the base is located, such as a floor. The pallet 152 may be placed on the loading ramp 140, 142, or on the ground or floor, and carried onto the loading ramp 140, 142. The loading ramp 140 may have a slope beginning from the ground, shown as an example at the farthest point from the sidewalls 120. This way, the pallet 152 may be carried from the ground onto the loading ramp 140.

The loading ramp 140, 142 is coupled to and maneuvered by loading arms 155 coupled to the delivery station's body, for example to the base or to a structure coupled to the base. The loading arms 155 receive power from an actuator (not shown), such as an engine. During standard operation mode, the loading ramp 140, 142 are located in a loading location inside the storage volume. When loading goods into the storage volume, the loading arms 155 may move the loading ramp 140, 142 from the loading location outside the storage volume. The loading arms 155 may move the loading ramp 140, 142 on any posture or direction desired by a person skilled in the art. Once the pallet 152 is located on the loading ramp 140, 142, the loading arms 155 move the pallet 152 and the loading ramp 140, 142 to the loading location inside the storage volume.

The delivery station may comprise a push-pull module for carrying storage devices such as pallets inside the housing. The push-pull module may also carry the packer when the collector collects the goods. Then, when loading a new storage device, or when removing a storage device from the housing, the push-pull module places the packer in a bay in the housing. Then, when preparing another order, the push-pull module moves to the bay and the packer is placed back on the push-pull module. When loading a new pallet, a push-pull module moves towards the loading location, collects the new pallet 152, and carries the new pallet 152 to a specific area inside the housing. Once the pallet is in place, the delivery station's memory updates that specific goods are located in a specific area. For example, sub-area #5 stores a total of 200 cans, of which 80 cans are diet coke, 50 cans are regular coke, and 70 cans are mineral water. This information may be received from a device operated by a person or robot that provided the pallet 152 outside the delivery station and sent a message that the pallet 152 is ready to be loaded. This information may be provided by a sensor, such as an image sensor, operating in the storage volume, using RFID, image processing techniques and the like.

Figure 2:
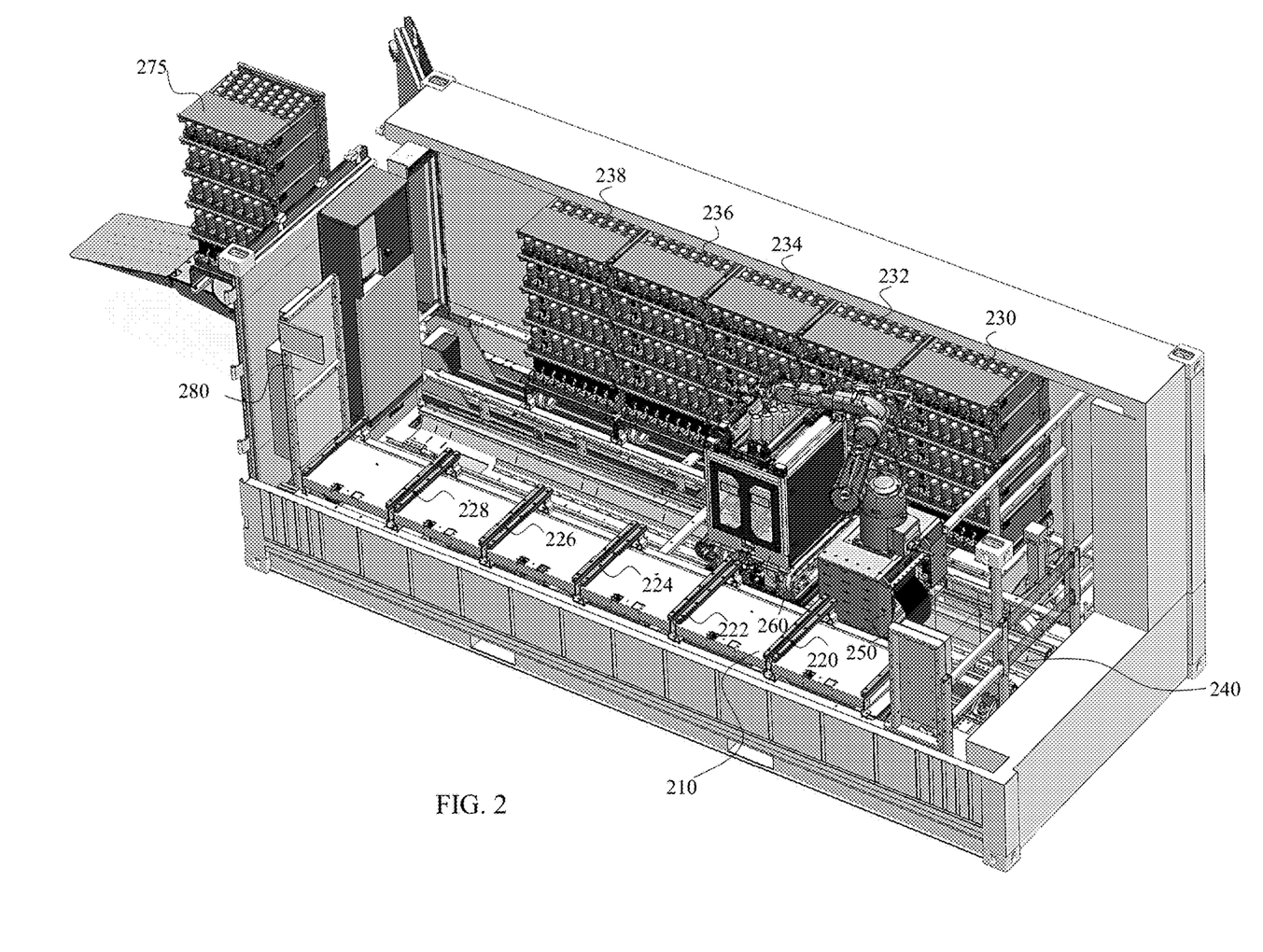
FIG. 2 shows a storage volume of the delivery station, according to exemplary embodiment of the invention.

FIG. 2 shows a storage volume of the delivery station, according to exemplary embodiment of the invention. The delivery station includes a kiosk 280 for delivering the goods, side tracks 220, 222, 224, 226, 228 for sliding the storage devices into places and a storage surfaces 210 for carrying the storage devices when located in storage position. The delivery station includes a main track 240 located along the longitudinal axis of the storage volume. The longitudinal axis may have one of its ends in, or close to, the aperture from which the storage devices 275 are loaded into the storage volume. This way, the storage devices 275 move along the main track 240 until reaching a desired located along the main track. The desired location may be one of the side tracks 220, 222, 224, 226, 228. Then, the storage devices 275 is pushed into one of the side tracks into the storage position. In standard operation, the storage devices 275 remains in the storage position until replacing the storage devices 275, for example when the storage devices is empty.

In some exemplary cases, storage devices are located on both sides of the main track 240. When loaded into the storage volume, the loading arms carry the storage devices 275 to a storage device surface moving along the main track. The storage device surface may be coupled to an actuator receiving commands as to the side track that collects the storage devices 275. For example, the command may be "move the storage device to the third side track to the left". FIG. 2 also shows storage devices represented as pallets 230, 232, 234, 236, 238 located in the storage positions on the left side of the main track 240 (left when viewed from the door 130), while the storage positions on the right side of the main track 240 are empty.

The delivery station includes a collector 250 movable along the main track 240. The collector includes a base coupled to the main track 240 and a collecting arm capable or collecting goods from the storage devices, such as pallets 230, 232, 234, 236, 238. The collector also 250 includes hardware for executing commands, such as "collect goods from tray #4 in pallet #12", or a list of goods to be collected and packed as a single order to be delivered. The collector 250 may be coupled to an actuator, such as a motor, that moves the collector 250 along the main track 240. In some other cases, the main track 240 may have magnetic units that attract the collector 250 by applying a magnetic field.

The delivery station includes a packer 260 for packing goods in a single order to be delivered via the kiosk 280. The packer 260 may move next to the collector 250, such that the collector 250 places goods collected by the collecting arm on a surface or a container of the packer 260. The packer 260 may be coupled to the collector 250 when the collector 250 collects the goods from the storage devices. Such coupling may be defined as the packer 260 being in direct physical contact with the collector 260, or that the packer 260 is placed on a movable element which is coupled to a base on which the collector 250 moves between the storage devices. When all the goods of a certain order are collected and placed on or inside the packer 260, the packer 260 packs the goods, for example by covering the goods in a bag. The bag may be sealed, or partly closed, facilitating carriage by a person. In some cases, the packer 260 may pack goods when the number of collected goods exceeds a threshold, for example due to size or weight constraints, such as pack every 6 cans, even if order is not completed.

Figure 3:
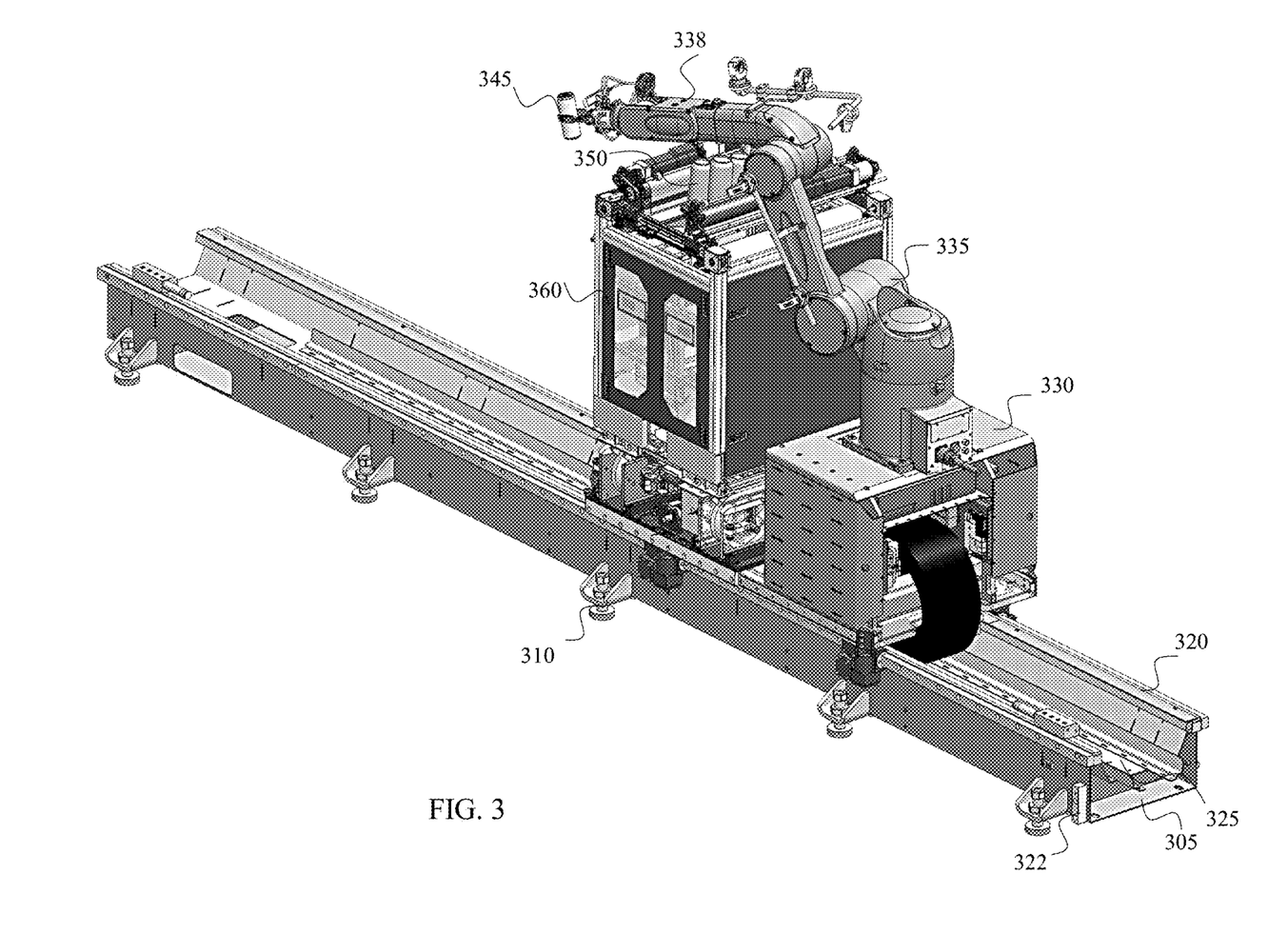
FIG. 3 shows a collector and packer on a main track of the delivery station, according to exemplary embodiment of the invention.

FIG. 3 shows a collector and packer on a main track of the delivery station, according to exemplary embodiment of the invention. The main track is coupled to the body of the delivery station, for example to the base of the housing, or to another structure coupled to the housing. The main track includes two track lips 320, 322 extending upwards from the base 305 of the main track. The base 305 and/or the track lips 320, 322 are secured to the body of the housing, for example using bolts 310, screws, or other coupling mechanisms. The main track may also comprise a central body 325 coupled above the base 305 along the longitudinal axis of the main track. In some cases, if the collector moves on wheels, each wheel travels on another side of the central body 325 of the main track.

The collector includes a collector base 330 that travels along the main track. The collector base 330 may comprise a collector actuator for moving the collector, and electronic circuitry, such as a controller or a processor, for executing commands received from a management unit of the delivery station. The collector also includes a collecting arm for collecting goods from the storage devices in the storage volume. The collecting arm extends form the collector base 330 and includes joints 338 and hinges 335, enabling to move different parts of the collecting arm at different directions. The distal part of the collecting arm includes an interface for physically touching the goods. The interface may change according to the desired goods. The collection arm may comprise multiple interfaces, each is associated with a different type or size of goods to be collected from the storage devices. For example, magnets for goods packed by ferromagnetic packages, and arms for carrying bottles. The distal part of the collecting arm may comprise one or more sensors, such as an image sensor, temperature sensor and the like, to facilitate collection of the goods from the storage devices.

The interface holds a can 345 collected from a storage device and places the can 345 next to other cans 350 located on a surface of the packer 360. The can 345 is exemplary only, and the collector may collect other forms of items, such as bottles, packages made of plastics, metals, paper and the like. When all the goods from a specific order are collected by the collector and placed in or on the packer 360, the packer 360 packs the goods and places the packed items near the kiosk, for delivery.

Figure 4A:
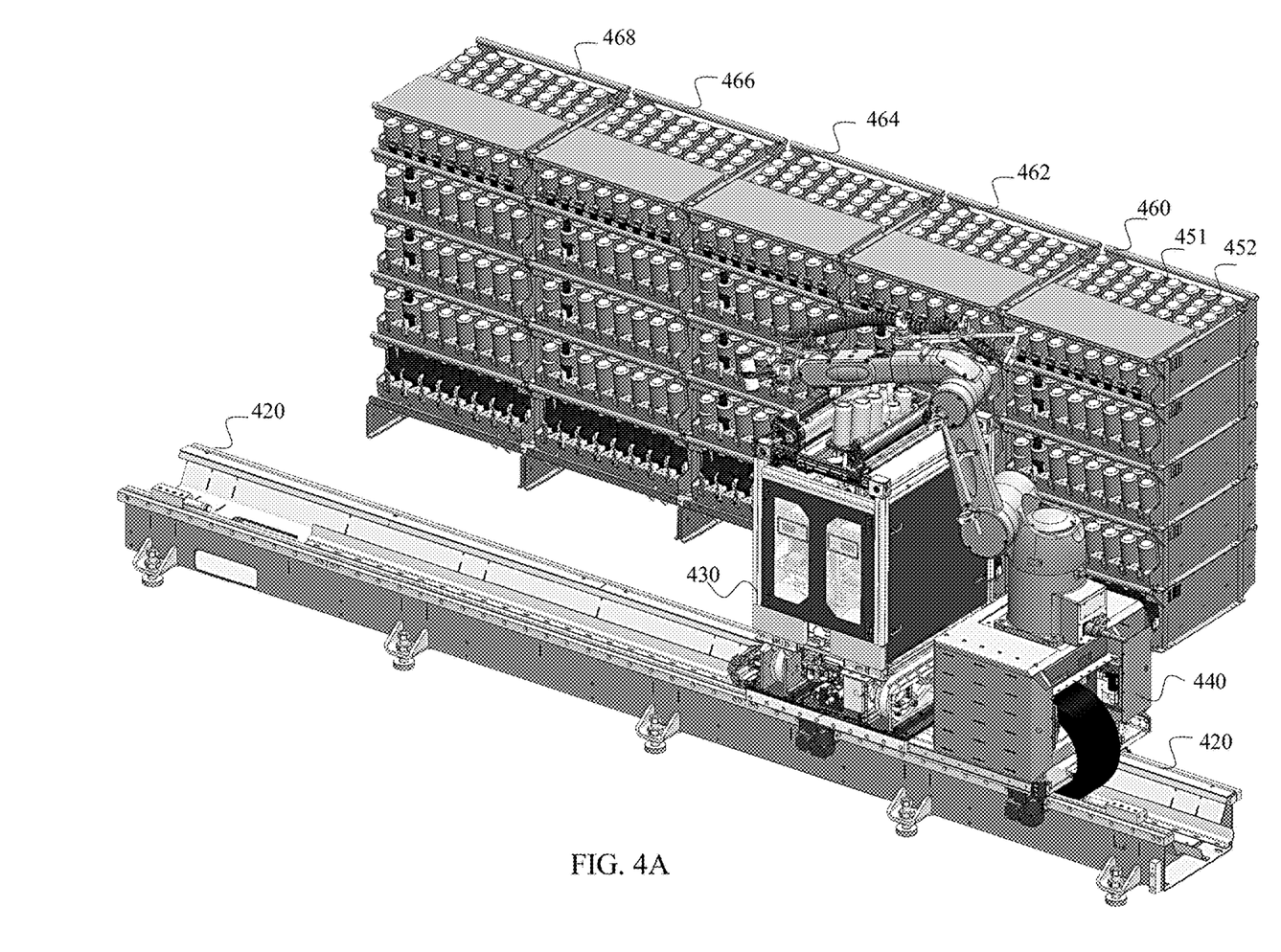
FIGS. 4A-4B show a collector collecting goods from a pallet of the delivery station, according to exemplary embodiment of the invention.
Figure 4B:
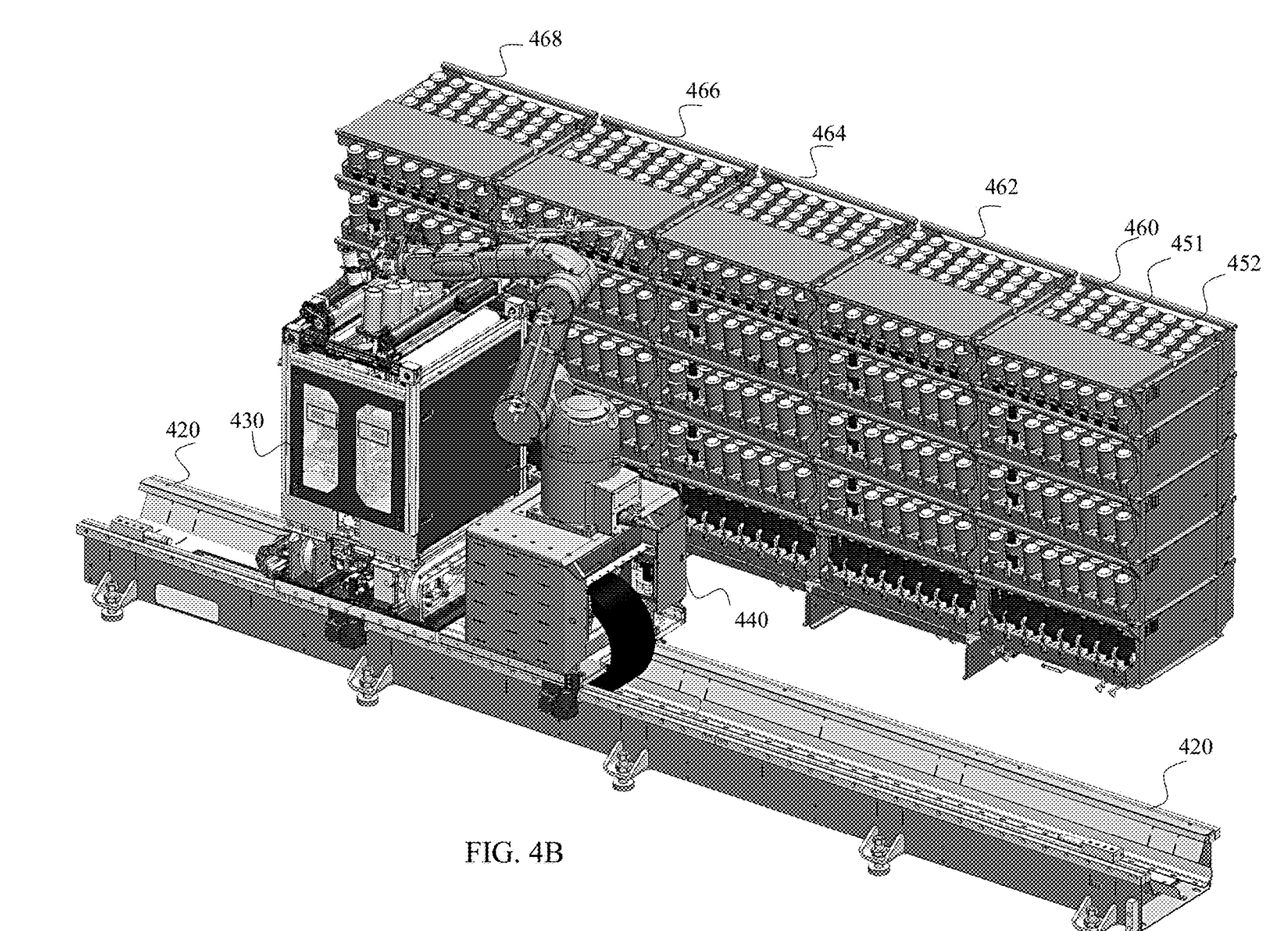

FIGS. 4A-4B show a collector collecting goods from a pallet of the delivery station, according to exemplary embodiment of the invention.

The collector 440 and the packer 430 move along the main track 420. On one side of the main track 420 there are multiple pallets 460, 462, 464, 466, 468, each of which stores goods. The amount of goods, type of goods and location of goods in the pallets may be known to the management system, for example stored in a memory of the management system, and the management system sends commands to the collector 440 based on this information. In some other cases, the collector 440 collects items based on image recognition techniques. For example, the collector 440 receives a list of items to be collected, identifies the items in real time from images and collects the items accordingly.

The collector 440 may collect the goods facing the main track, or goods located in other sections of the pallets which are accessible thereto, for example the topmost section of pallets. For example, the collector 440 may collect items 451, 452 located in a top section of pallet 460.

In FIG. 4B, the collector 440 and the packer 430 move towards pallet 468. In some cases, the size of the housing defines that there is a single main track for both the collector and the packer. In some other cases, the delivery station may comprise multiple collectors and packers traveling inside the storage volume. For example, multiple collectors may collect goods of a single order and place the goods in a single packer. In some cases, the delivery station may comprise multiple tracks, for example two tracks, one track on the right side of the housing and a second track on the left side of the housing, to enable the delivery station to produce more orders on a given time unit.

Figure 5A:
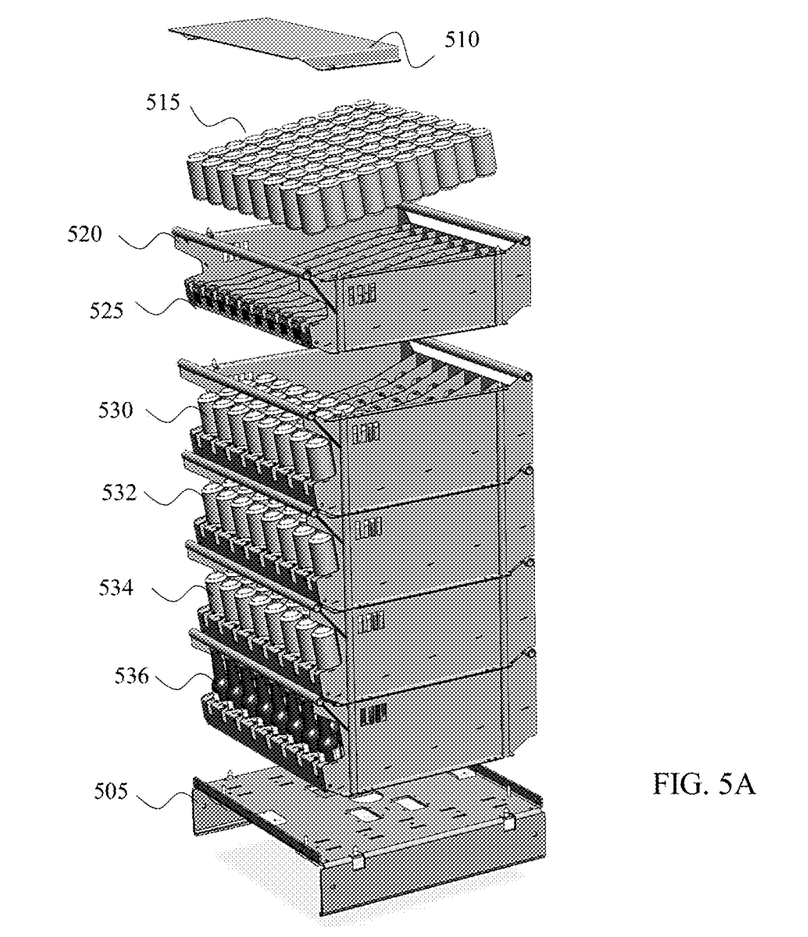
FIGS. 5A-5B show a pallet storing goods used in the delivery station, according to exemplary embodiment of the invention.
Figure 5B:
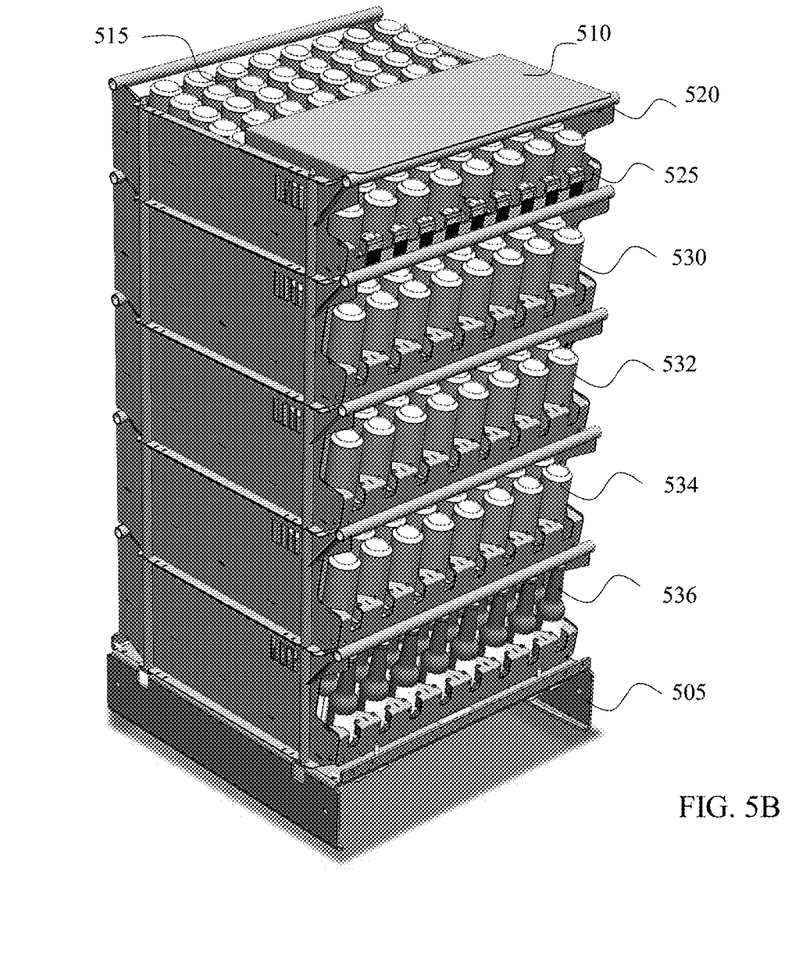

FIGS. 5A-5B show a pallet storing goods used in the delivery station, according to exemplary embodiment of the invention. The goods of the delivery station are arranged on stacked shelves or trays, such as tray 520. The stacked trays are mounted on a pallet 505, for easy transfer. The surface of the tray 520 is in slope facing the main track on which the collector moves, such that the goods move downwards the surface when previous items are collected from the tray 520. A buffer, such as buffer 510, is coupled to at least some of the trays, to protect the goods. The trays may be stacked one on top the other using the structure of the trays, for example using pins, niches, protruding members and the like, which are an integral, non-removable part of the trays. The trays stacked on top a single pallet may contain multiple types of goods, such as beverages, cigarettes, and clothing items. At least some of the trays comprise barriers, such as barrier 525, configured to prevent the goods 530, 532, 534, 536 from falling from the tray towards the main track, as the tray's surface is in slope.

Figure 6:
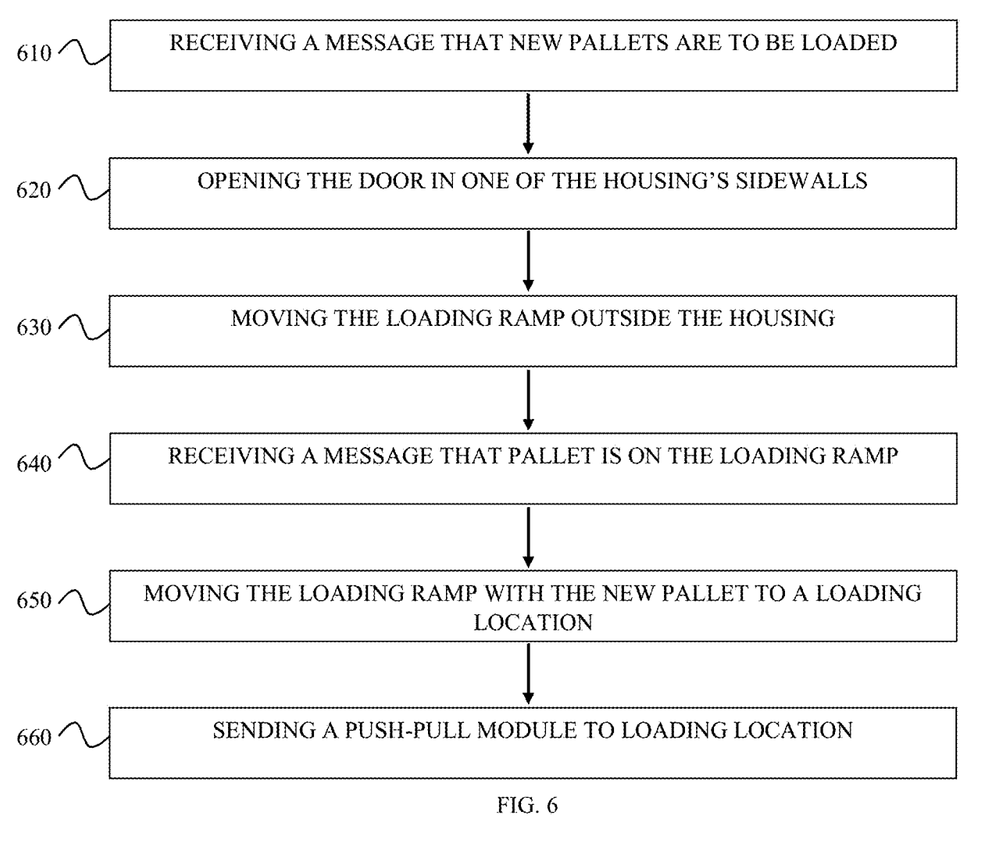
FIG. 6 shows a method for loading goods into the delivery station, according to exemplary embodiments of the invention.

FIG. 6 shows a method for loading goods into the delivery station, according to exemplary embodiments of the invention.

Step 610 discloses receiving a message that new pallets are to be loaded. The message may be received in response to scanning a tag by an operator/driver that brings the pallets to the container. The message may be received via a management system of the system, for example from a server that manages loading processes of multiple supply stations.

Step 620 discloses opening the door in one of the housing's sidewalls. The door may be opened by the person or device in charge of the loading process, for example using a knob or other controlling mechanism that unlocks the door and enables opening of the door. In some cases, the unlocking mechanism may be electrically controlled, enabling the door to automatically open in view of an event, such as receiving a command from the management system. The command may be initiated when the person handling the loading process is identified at the housing.

Step 630 discloses moving the loading ramp outside the housing. The loading ramp may be coupled to arms, or to another mechanism, that moves the loading ramp 140. When moving outside the housing, the loading ramp may carry an empty storage device, or not carry any storage devices.

Step 640 discloses receiving a message that one or more storage devices such as a pallet is on the loading ramp. The pallet may be placed on the loading ramp by a person, for example using a forklift. The message may be received in response to a sensor that senses weight on the loading ramp, in response to a message from the person handling the loading process, and the like. The message may comprise details of the pallet's content, for example "120 cans of beverage #1, 40 bottles of beverage #4".

Step 650 discloses moving the loading ramp with the new pallet to a loading location. The loading location is located inside the housing, and defines the location of the loading ramp during non-loading processes. When there is no need to load new pallets or remove old pallets, the loading ramp stays at the loading location. When loading a new pallet, the new pallet is first stored at the loading location, above the loading ramp, and moved to place by the push-pull module.

Step 660 discloses sending a push-pull module to loading location. The push-pull module may move along the main track inside the housing, or move based on guidelines, such as a location of the loading location. Then, step 670 discloses the push-pull module collecting the pallet at loading location. The push-pull module may move arms towards niches in a bottom section of the pallet. The arms may secure the pallet to the push-pull module. Then, step 680 discloses moving pallet to a specific destination. The specific destination may be sent to the push-pull module that carries the pallet to the pallet's destination. The destination may be determined by the management system.

Figure 7:
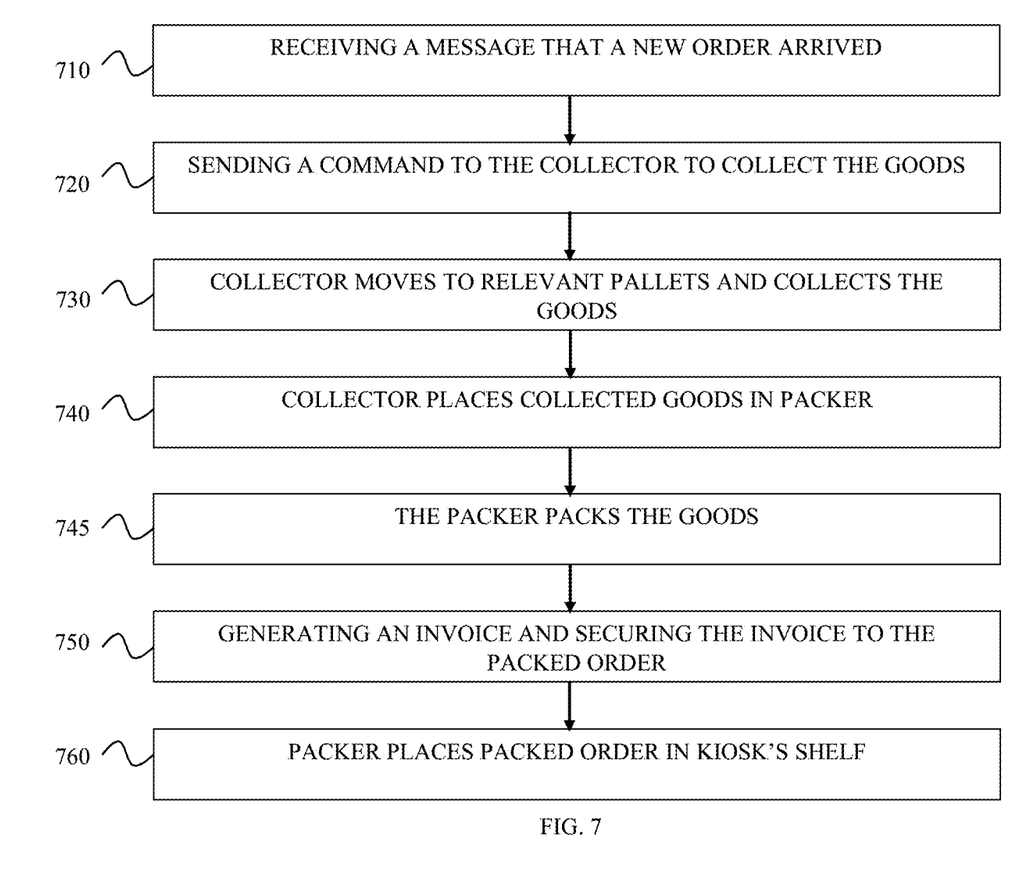
FIG. 7 shows a method for collecting goods by a collector located in the housing of the delivery station, according to exemplary embodiments of the invention.

FIG. 7 shows a method for collecting goods by a collector located in the housing of the delivery station, according to exemplary embodiments of the invention.

Step 710 discloses receiving a message that a new order arrived. The message may be received over the internet from an ordering server, or from a user interface physically coupled to the housing of the delivery station. The message may comprise payment verification, and quantities of one or more goods. The message may comprise an order identifier, such as the serial number of the order, and/or details of the person collecting the order.

Step 720 discloses sending a command to the collector to collect the goods. The command may comprise locations of the goods in the storage devices, such as "3 cans from shelf #2 of pallet #5 and 5 packages of shelf #6 of pallet #12". In some other cases, the command may comprise identifier of the goods, such as "Quantity=3, item=25 and quantity=5, item=81". The command may be sent over a wireless technique, such as Wi-Fi, blue-tooth and the like.

Step 730 discloses collector moves to relevant pallets and collects the goods. The collector may comprise an actuator that moves the collector inside the housing. The collector may move along the main track, or move on a floor of the housing, or on another surface desired by a person skilled in the art. The collector may move in tandem with the packer.

Step 740 discloses collector places collected goods in packer. The packer may comprise a horizontal surface, such as a shelf, that enables to securely place items thereon. The collector's collecting arm moves the goods from the pallets, for example using magnets, using vacuum pads, using grasping arms and the like.

Then, in step 745, the packer packs the goods, either using a rigid or elastic package, such as a paper bag, a plastics package and the like.

Step 750 discloses generating an invoice and securing the invoice to the packed order. The invoice may be generated using a printer. The printer may be coupled to the packer, or to the kiosk. The invoice may have a sticker with adhesive materials that enables to place the invoice at the packed order.

Step 760 discloses packer places packed order in kiosk's shelf. In some cases, there may be multiple packed orders placed in the housing, in various pending shelves. The management system may obtain an identifier of each pending shelf for each order, such that when a person arrives to collect the order, the management system can send a robot to the relevant pending shelf to move the relevant order to the kiosk.

Figure 8:
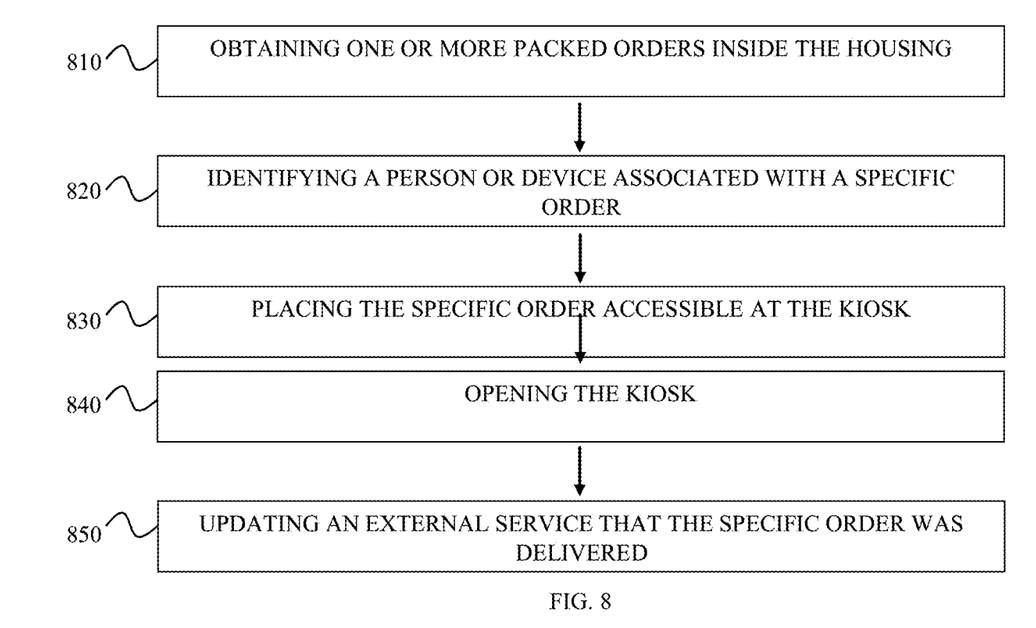
FIG. 8 shows a method for delivering goods by a collector located in the housing of the delivery station, according to exemplary embodiments of the invention.

FIG. 8 shows a method for delivering goods by a collector located in the housing of the delivery station, according to exemplary embodiments of the invention.

Step 810 discloses obtaining one or more packed orders inside the housing. The packed orders may be placed in pending shelves in the housing. The pending shelves may be placed on top of the pallets.

Step 820 discloses identifying a person or device associated with a specific order. Identifying may be performed by the person scanning an identifier at a scanner coupled to the housing, or by sending a message from the person's mobile device, such as a cellular phone, to a server communicating with the management system of the station.

Step 830 discloses placing the specific order accessible at the kiosk. The kiosk may have a close state in which the goods are inaccessible from outside the housing and an open state in which the goods are accessible from outside the housing. The specific order may be placed in a shelf.

Step 840 discloses opening the kiosk. Opening the kiosk may be performed by moving a shelf vertically or horizontally.

Step 850 discloses updating an external service that the specific order was delivered. Updating may be performed by sending a message to a server that manages the orders.

The autonomous system includes a memory for storing information. The memory may store a set of instructions for performing the methods disclosed herein. The memory may also store rules for operating the autonomous system, for example algorithms for collecting goods from the storage devices when receiving a new order, commands to be sent to the robotic arm, and the like. The autonomous system may also comprise a communication unit for exchanging information with other systems/devices, such as user's devices, remote warehouses when requesting new goods to be loaded, and the like. The autonomous system includes a processor for executing the instructions stored in the memory. The processor may be a general purpose processor, a microprocessor, or any other processor desired by a person skilled in the art.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings without departing from the essential scope thereof. Therefore, it is intended that the invention not be limited to the particular embodiments disclosed herein.

What is claimed is:

1. A fully autonomous delivery station, comprising:
a management unit for receiving orders for goods;
a housing, comprising:
one or more storage devices containing goods to be delivered,
a moving collector moving between the one or more storage devices for collecting the goods, and
a kiosk used by a user of the delivery station for receiving the goods outside the housing; and
a packer module for packing multiple goods collected by the collector of a single order,
wherein the packer is secured to the collector when the collector collects the goods from the one or more storage devices.

2. The delivery station of claim 1, wherein the management system sends identifiers of goods requested in the orders to the collector and the collector identifies the goods in the storage devices.

3. The delivery station of claim 1, further comprising a user interface coupled to the management system, said user interface is configured to receive an identifier of a specific order.

4. The delivery station of claim 1, wherein at least some of the one or more storage devices is a pallet.

5. The delivery station of claim 1, further comprising a main track installed on a longitudinal axis of the housing, wherein the moving collector moves along the main track.

6. The delivery station of claim 1, further comprising a push-pull module configured to move pallets inside the housing.

7. The delivery station of claim 1, wherein the housing comprises a base, sidewalls extending from the base, wherein the delivery station comprises a door having an open state and a close state.

8. The delivery station of claim 1, further comprising a loading ramp configured to load new storage devices into the housing; wherein the loading ramp is movable outside the housing.

9. The delivery station of claim 8, further comprising arms coupled on one side to the housing and on another side to the loading ramp, said arms maneuver the loading ramp.

10. The delivery station of claim 1, wherein the management system sends locations of goods requested in the orders to the collector.

11. The delivery station of claim 10, wherein the locations comprise an identifier of a specific storage device and height of the goods in the specific storage device.

12. A fully autonomous delivery station, comprising:
a management unit for receiving orders for goods;
a housing, comprising:
one or more storage devices containing goods to be delivered,
a moving collector moving between the one or more storage devices for collecting the goods, and
a kiosk used by a user of the delivery station for receiving the goods outside the housing; and
a push-pull module configured to move pallets inside the housing.

13. The delivery station of claim 12, further comprising a packer module for packing multiple goods collected by the collector of a single order.

14. The delivery station of claim 13, wherein the packer is secured to the collector when the collector collects the goods from the one or more storage devices.

15. The delivery station of claim 12, wherein the management system sends locations of goods requested in the orders to the collector.

16. The delivery station of claim 15, wherein the locations comprise an identifier of a specific storage device and height of the goods in the specific storage device.

17. The delivery station of claim 12, wherein the management system sends identifiers of goods requested in the orders to the collector and the collector identifies the goods in the storage devices.

18. A fully autonomous delivery station, comprising:
a management unit for receiving orders for goods;
a housing, comprising:
one or more storage devices containing goods to be delivered,
a moving collector moving between the one or more storage devices for collecting the goods, and
a kiosk used by a user of the delivery station for receiving the goods outside the housing; and a loading ramp configured to load new storage devices into the housing, wherein the loading ramp is movable outside the housing.

19. The delivery station of claim 18, further comprising arms coupled on one side to the housing and on another side to the loading ramp, said arms maneuver the loading ramp.

20. The delivery station of claim 18, further comprising a packer module for packing multiple goods collected by the collector of a single order.

* * * * *